United States Patent [19]

Mochida et al.

[11] Patent Number: 4,587,090
[45] Date of Patent: May 6, 1986

[54] FUEL ASSEMBLY FOR BOILING WATER REACTOR

[75] Inventors: Takaaki Mochida; Junichi Yamashita, both of Hitachi, Japan

[73] Assignee: Hitachi, Ltd., Tokyo, Japan

[21] Appl. No.: 548,845

[22] Filed: Nov. 4, 1983

[30] Foreign Application Priority Data

Nov. 5, 1982 [JP] Japan ............................ 57-194300

[51] Int. Cl.$^4$ ............................................. G21C 3/30
[52] U.S. Cl. .................................... 376/428; 376/419; 376/435; 376/447
[58] Field of Search ................. 376/435, 428, 419, 447

[56] References Cited

U.S. PATENT DOCUMENTS 4,244,784  1/1981  Takeda ................... 376/435
4,280,874  7/1981  Kawai .................... 376/435

Primary Examiner—Donald P. Walsh
Attorney, Agent, or Firm—Antonelli, Terry & Wands

[57] ABSTRACT

A fuel assembly for loading in the core of a boiling water reactor comprises a large number of vertically extending fuel rods, some of which contains a burnable poison, where a rod-average uranium enrichment of fuel is higher in the upper region of the fuel assembly than in the lower region and a total content of the burnable poison is lower in the lower region of the fuel assembly than in the upper region and a spectral shift effect of the boiling water reactor is increased while thoroughly maintaining a reactor shutdown margin, and a discharge exposure is increased.

6 Claims, 11 Drawing Figures

THE INVENTION

W: WATER ROD

THE PRIOR ART

W: WATER ROD

THE INVENTION

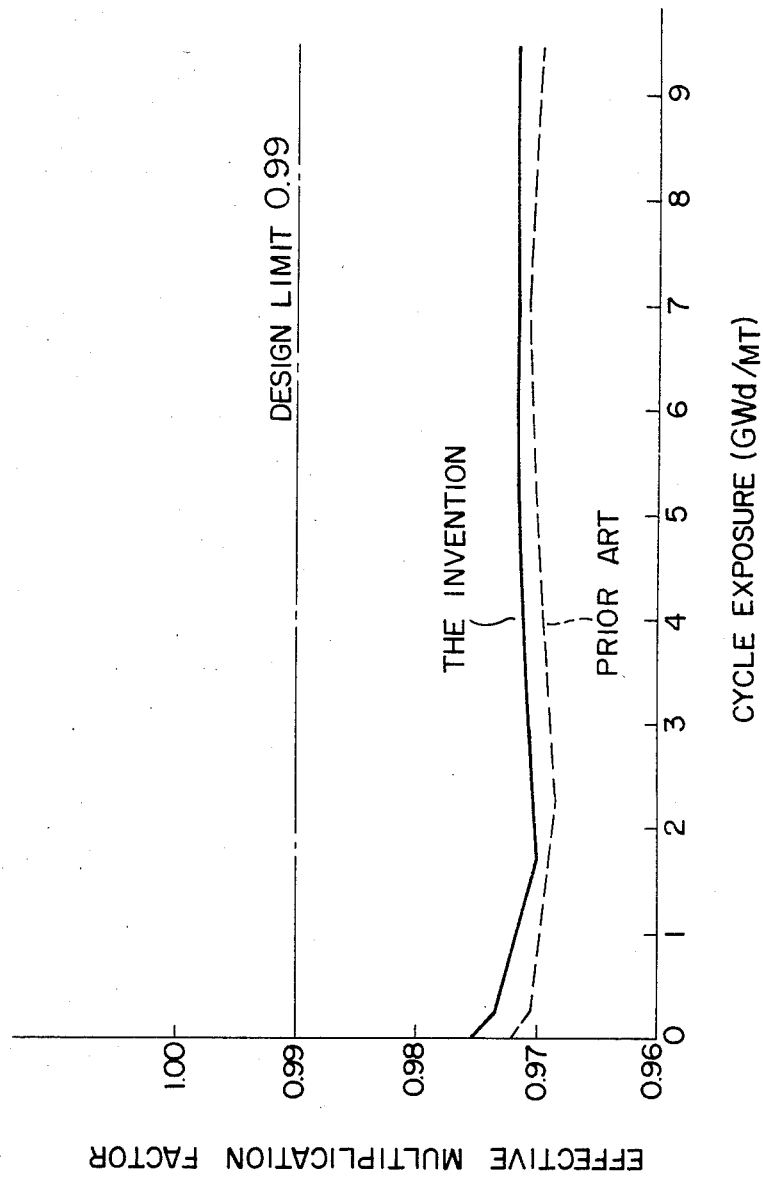

FUEL ASSEMBLY FOR BOILING WATER REACTOR

BACKGROUND OF THE INVENTION

This invention relates to an improved fuel assembly for a boiling water reactor with an increased burnup.

A boiling water reactor, which will be hereinafter referred to as "BWR", has an axial void distribution, and thus neutron moderation is faster and the reactivity is higher in the lower region of a core than in the upper region, and the power distribution is so deformed that the axial power peak position is shifted downwards in the core.

According to the conventional core design, a linear heat generation ratio (power per unit length of fuel rod) is designed to be kept low by controlling the axial power peak as much as possible in view of maintenance of fuel soundness and increase in capacity factor, and thus it has been proposed that control rods are inserted shallowly at the axial power peak position in the lower region of a core (these control rods are called "shallow control rods") or fuel rods containing gadolinia ($Gd_2O_3$) as a burnable poison for controlling the reactivity are inserted at the axial power peak position (U.S. Pat. No. 4,229,258).

Axially-zoned fuels having different enrichments in the upper and lower regions of the fuel assembly recently developed have a lower uranium enrichment in the lower region of the fuel assembly than in the upper region thereof, where the infinite neutron multiplication factor is decreased in the lower region to reduce the power peak and flatten the power distribution. The axially-zoned fuels have been found to have a particularly distinguished effect on flattening of axial power distribution, as compared with use of said shallow control rods and use of fuel rods containing burnable poison at the axial power peak position and have been increasingly used (said U.S. Pat. No. 4,229,258).

However, as a result of recent development of fuel technology, PCI (pellet cladding interaction) resistant fuels such as a barrier fuel using a cladding with a Cu or Zr-plated inner surface have been proposed [Japanese Patent Application Kokai (Laid-open) No. 51-69792 corresponding to U.S. Patent Application Ser. No. 522,767]. As a result, the flattenting of power distribution so far utilized has not been particularly required, and the linear heat generation ratio can be increased so far as the soundness of fuel can be maintained, that is, without any fear of damage at cladding. In such a core, a new core design utilizing the feature of BWR has been in demand without any consideration of flattening of power distribution. That is, BWR has such a feature that in a fuel used in a high void fraction a neutron spectrum is more hardened than in a fuel used in a low void fraction, and consequently plutonium accumulation tends to increase and this tendency is more pronounced with burning of fuel. Thus, an operation to increase burnup by conducting operation in a high void fraction in an operating cycle to increase formation of plutonium and reducing the void fraction at the end of cycle to shift the neutron spectrum and increase the reactivity of plutonium so far formed has been proposed and called "spectral shift operation" (Churlik, D. G. et al: Extending BWR Burnup with Special Shift Control, papers disclosed at American Nuclear Society Topical Meeting on LWR Extended Burnup-Fuel Performance and Utilization, Apr. 4–8, 1982, Volume 2, pages 7–91 to 7–107).

The reactivity gain at the end of cycle by the spectral shift operation can be obtained by reduction in average void fraction in a core and upward shifting of axial power distribution.

Owing to a feature of BWR that the power distribution is shifted downwards in the beginning of cycle, BWR is advantageous for the spectral shift effect. To utilize the spectral shift to a maximum in BWR, it is necessary to give a BWR such a characteristic as a larger power in the lower region of a core and a higher void fraction in the beginning of cycle and a larger power in the upper region and a lower void fraction at the end of cycle.

A step for satisfying this necessity is to use a fuel assembly having a lower total gadolinia content in the upper region of the fuel assembly than in the lower region thereof and an equal fuel enrichment both in the upper and lower regions to increase the reactivity in the upper region of the core at the end of cycle. However, such a problem as a decrease in reactor shutdown margin, i.e. a safety margin for keeping a reactor in a non-critical state by inserting control rods even in a cold state of reactor remains to be solved even in that case. That is, a power distribution of reactor in a cold state has a peak in the upper region of the core, and if the total gadolinia content in the upper region of the fuel assembly is low, the control capacity of gadolinia is lowered, and the reactor shutdown margin is decreased.

SUMMARY OF THE INVENTION

The object of the present invention is to provide a fuel assembly for BWR with an increased spectral shift effect and increased burnup with a satisfactory reactor shutdown margin which can satisfy the said necessity and solve the said problem.

The said object can be attained according to the present fuel assembly for BWR which comprises a large number of vertically extended fuel rods, some of which contains a burnable poison, a rod-average uranium enrichment of the fuel assembly being higher in the upper region of the fuel assembly than in the lower region and a total content of the burnable poison being lower in the lower region of the fuel assembly than in the upper region. In the present invention, it is not always necessary that a boundary level between the upper region and the lower region for the rod average uranium enrichment of the fuel assembly is identical with that between the upper region of the fuel assembly and the lower region for the total content of burnable poison.

Fuel rods for use in the present invention are the so called barrier fuel rods using zircaloy claddings with Cu or Zr-lined inner surfaces, and burnable poison for use in the present invention includes gadolinia, $B_4C$, etc. and gadolinia is preferably used in the present invention.

The present invention will be described in detail below, referring to the accompanying drawings.

BRIEF DESCRIPTION OF THE DRAWINGS

FIG. 9 is a diagram showing reactor shutdown margin according to the same embodiment as above, as compared with the same prior art as above.

PREFERRED EMBODIMENTS OF THE INVENTION

Figure 1:
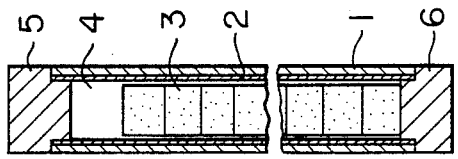
FIG. 1 is a schematic view of barrier fuel rod for use in the present fuel assembly.

An example of barrier fuel rod for use in the present BWR fuel assembly is shown in FIG. 1, where the inner surface of a zircaloy cladding 1 is lined with a Cu or Zr layer 2 by plating, and fuel pellets 3 are filled in the cladding. A gas plenum 4 is provided at the upper end of the fuel pellets, and the cladding is sealed with end plugs 5 and 6 at the upper and lower ends, respectively.

One embodiment of the present BWR fuel assembly comprising the said barrier fuel rods will be described below in comparison with a prior art.

Figure 2A:
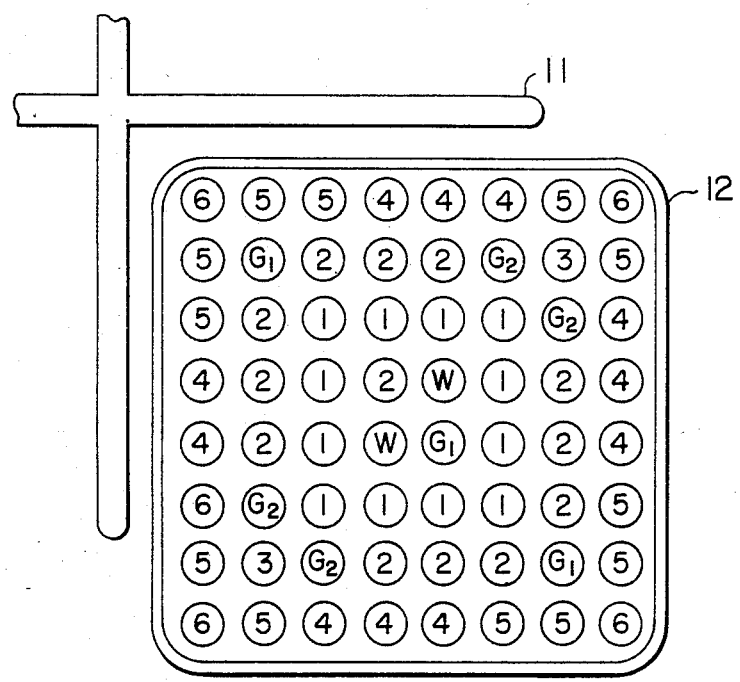
FIG. 2A is a cross-sectional view of a prior art fuel assembly and FIG. 2B shows a U-235 enrichment and gadolinia content distribution in fuel rods in the prior art fuel assembly of FIG. 2A.
Figure 2B:
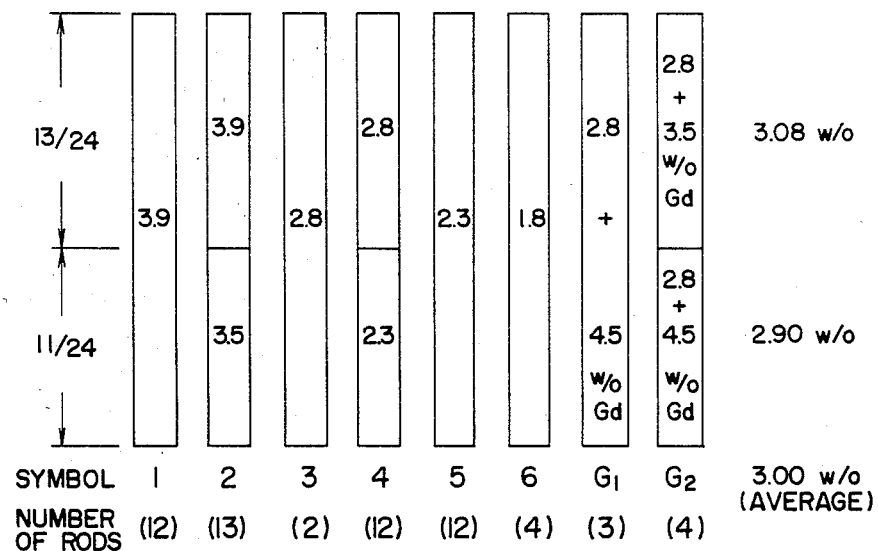

In FIG. 2A, the cross-sectional view of a prior art fuel assembly is shown, and in FIG. 2B, U-235 enrichment and gadolinia content distribution in fuel rods in the prior art fuel assembly of FIG. 2A are shown. The fuel assembly comprises a large number of vertically extended fuel rods, some of which are divided into an upper region and a lower region at the level of 11/24 from the bottom of fuel rod effective lengths (full length of fuel pellets filled in a cladding), and have different enrichments and different gadolinia contents in the respective regions. Figures in FIG. 2B show U-235 enrichments in percentage by weight (W/O) and figures in W/O Gd show a gadolinia content in percentage by weight. In the prior art fuel assembly, the rod average enrichment in the upper region of the fuel assembly is 3.08 W/O, which is higher than the rod average enrichment in the lower region of the fuel assembly, i.e. 2.90 W/O, and the number of gadolinia-containing fuel rods are the same both in the upper and lower regions of the fuel assembly. The gadolinia total content is higher in the lower region of the fuel assembly than in the upper region thereof. In FIG. 2A, 11 is a control rod and 12 is a channel box.

Figure 3A:
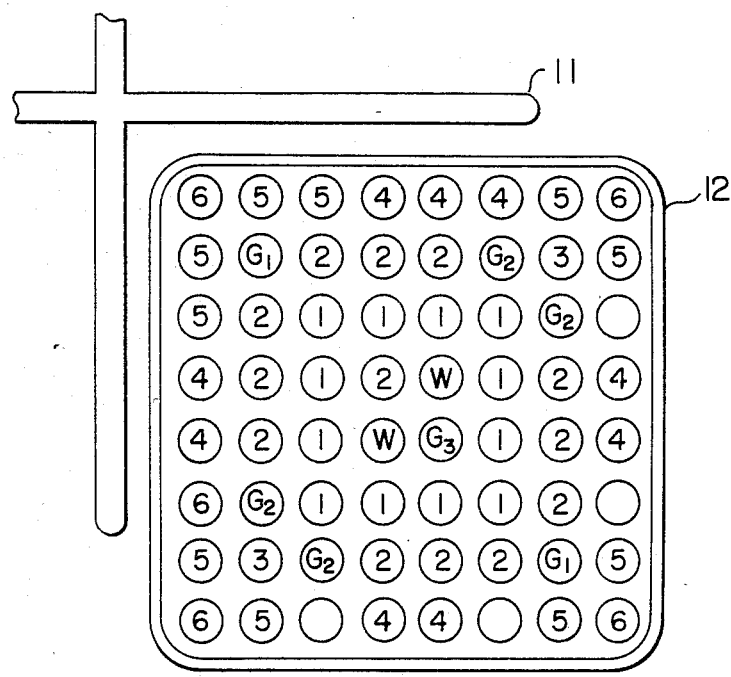
FIG. 3A is a cross-sectional view of a fuel assembly according to one embodiment of the present invention.
Figure 3B:
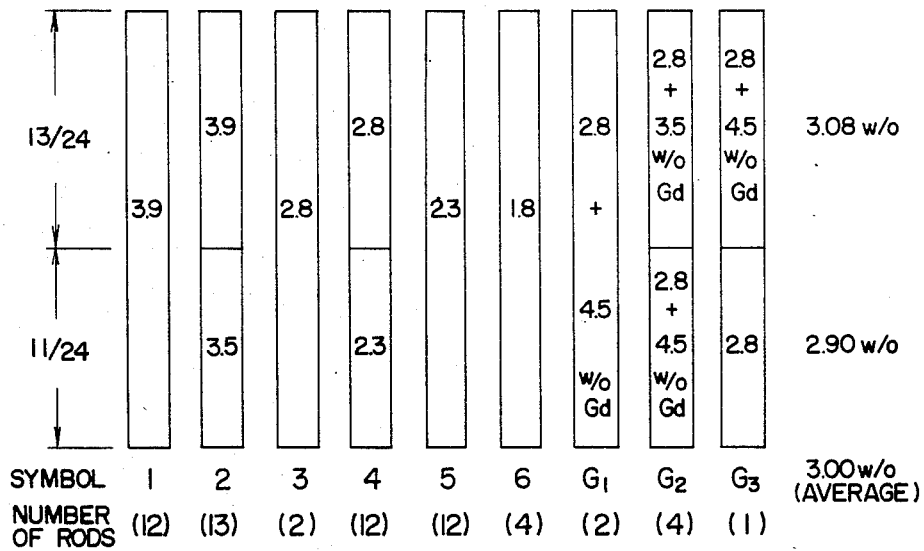
FIG. 3B shows U-235 enrichment and gadolinia content distribution in fuel rods in the present fuel assembly of FIG. 3A.

In FIG. 3A is shown, on the other hand, one embodiment of a fuel assembly according to the present invention, and in FIG. 3B are shown U-235 enrichment and gadolinia content distribution in fuel rods in the present fuel assembly of FIG. 3A.

In the present invention, the fuel assembly is also divided into an upper region and a lower region, where the rod average U-235 enrichment is higher in the upper region of the fuel assembly than in the lower region thereof, and a fuel rod containing gadolinia in the upper region of the fuel assembly, shown by symbol $G_3$, is used in the present fuel assembly. Thus, the number of gadolinia-containing fuel rods in the upper region of the fuel assembly is 7, whereas the number of gadolinia-containing fuel rods in the lower region of the fuel assembly is 6. That is, the number of gadolinia-containing fuel rods is less in the lower region of the fuel assembly than in the upper region thereof. The total gadolinia content (gadolinia content × number of gadolinia-containing fuel rods in total) is 4.5 W/O×3+3.5 W/O×4=27.5 W/O in the upper region of the fuel assembly, which is more than 4.5 W/O×6=27.0 W/O in the lower region of the fuel assembly.

Figure 4:
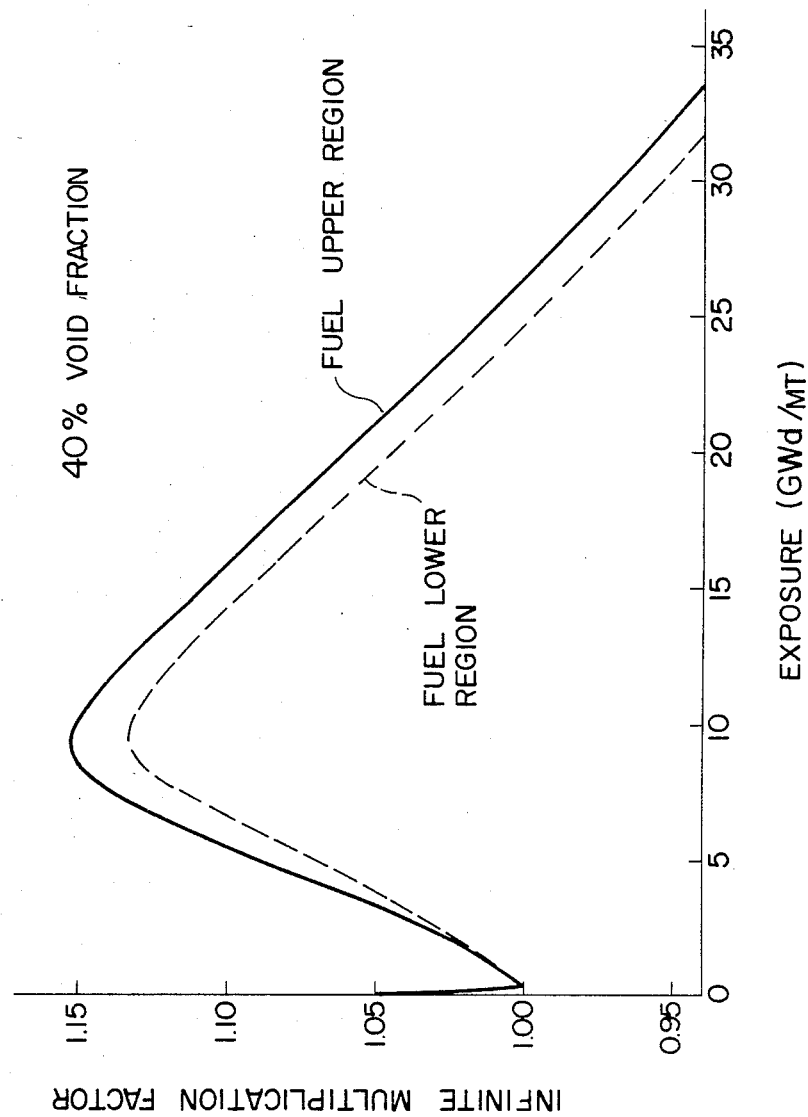
FIG. 4 is a diagram showing relationship between the infinite multiplication factor at 40% void fraction and exposure according to the embodiment shown in FIGS. 3A and 3B.

Relationship between the infinite neutron multiplication factor and the exposure of the fuel assembly according to the said embodiment of the present invention is shown in FIG. 4. The present fuel assembly using axially-zoned fuel having different enrichments in the upper and lower regions of the fuel assembly has a higher infinite multiplication factor in the upper region than in the lower region, and is thus offset with a difference in axial reactivity due to the voids in the core, thereby fattening the power distribution. This is remarkable particularly from the middle to the end of burnup (10 GWd/MT to 25 GWd/MT).

In the beginning of burnup, on the other hand, the effect of gadolinia on the control of reactivity is less in the lower region of the fuel assembly due to a smaller number of gadolinia-containing fuel rods in the lower region of the fuel assembly than in the upper region of the fuel assembly, and thus the difference in axial reactivity between the upper and lower regions of the fuel assembly is less. In a core having an axial void distribution, the reactivity in the lower region of the core having a lower void fraction is so increased as to have a power peak in the lower region of the core.

Figure 6:
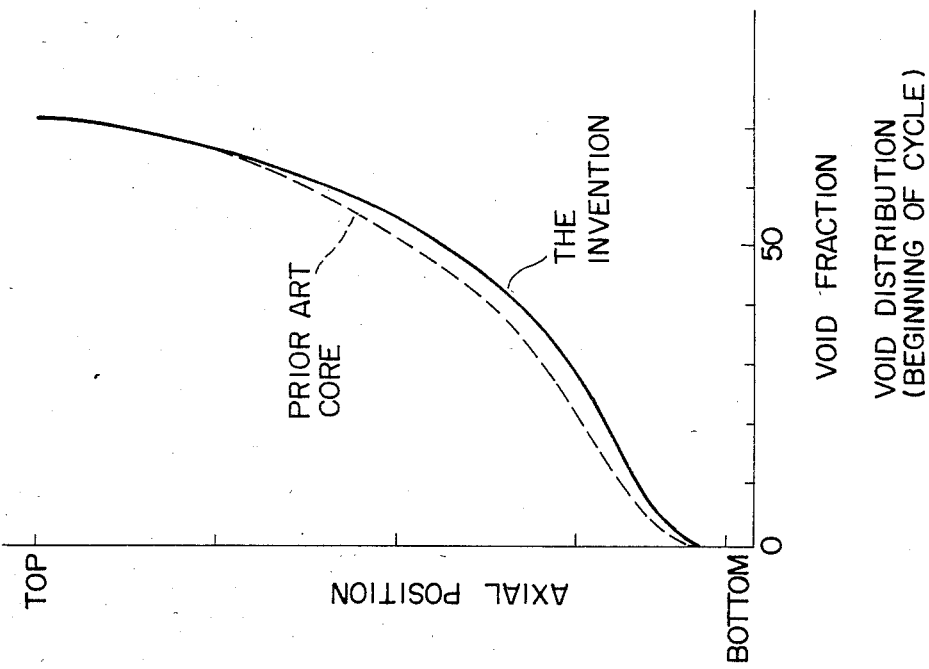
FIG. 6 is a diagram showing void distribution in the core in the beginning of cycle according to the same embodiment as above, as compared with the same prior art as above.
Figure 5:
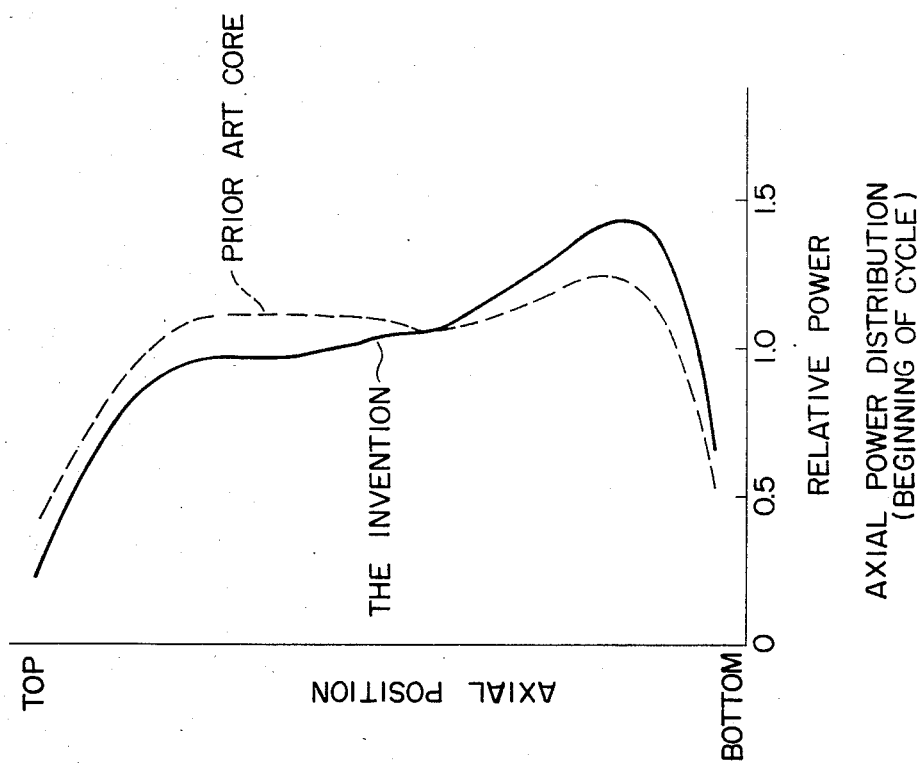
FIG. 5 is a diagram showing axial power distribution in the core in the beginning of cycle according to the embodiment shown in FIGS. 3A and 3B, as compared with that of the prior art of FIGS. 2A and 2B.

In FIG. 5, the axial power distribution in the beginning of cycle in a core loaded with the fuel assembly according to the said embodiment of the present invention is compared with that of the said prior art fuel assembly. According to the embodiment of the present invention, a power peak is about 15% increased due to a power increase in the lower region of core, as compared with that of the prior art fuel assembly, and thus an average void fraction is about 2.6% increased in the core, as in FIG. 6 showing the axial void distribution in the core.

Figure 8:
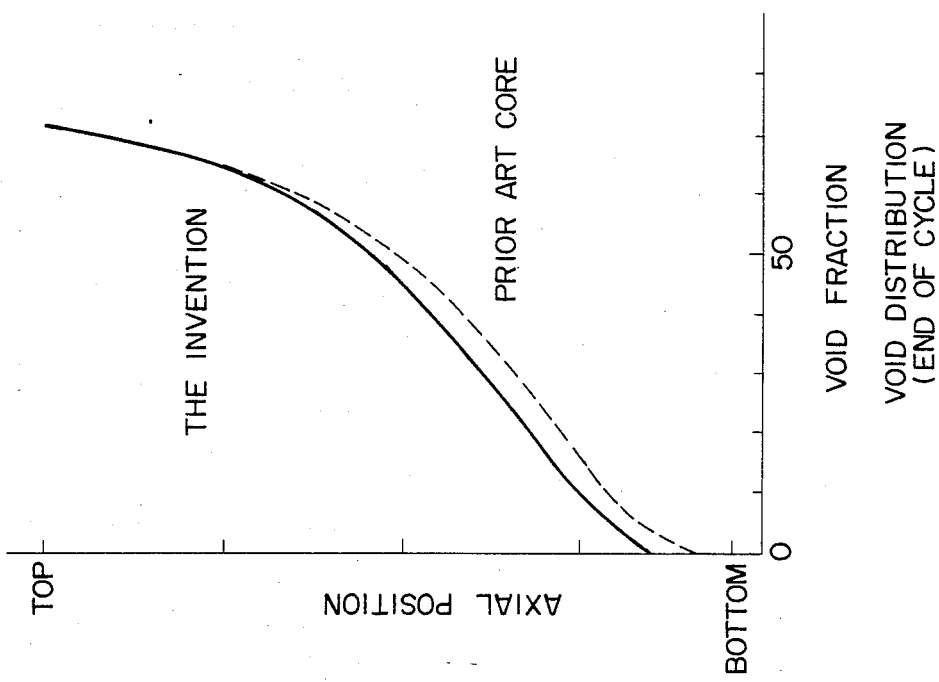
FIG. 8 is a diagram showing void distribution in the core at the end of cycle according to the same embodiment as above, as compared with the same prior art as above.
Figure 7:
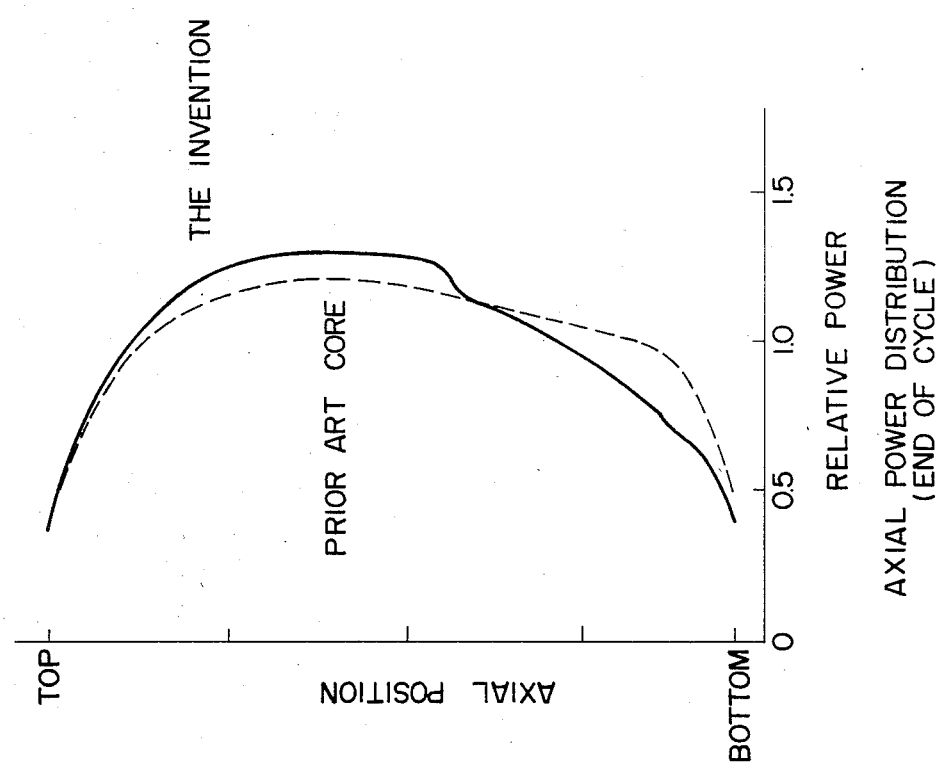
FIG. 7 is a diagram showing axial power distribution in the core at the end of cycle according to the same embodiment as above, as compared with the same prior art as above.

In FIG. 7, an axial power distribution in the core at the end of cycle is compared between the present embodiment and the prior art fuel assembly. Gadolinia is burned up at the end of cycle, and thus the power peak is shifted upwards in the present embodiment, as compared with that of the prior art fuel assembly. The average void fraction in the core is reduced, and a more remarkable spectral shift effect can be obtained. In FIG. 8, the axial power distribution in the core in that case is shown, where the void fraction is decreased in the present embodiment, as compared with that of the prior art fuel assembly.

In the fuel assembly according to the said embodiment of the present invention, the effective multiplication factor ΔK at the end of cycle is 0.16% increased, as compared with that of the prior art fuel assembly. This corresponds to an increase in discharge exposure by about 500 MWd/MT without any increase in enrichment.

In FIG. 9, an effective multiplication factor of the core when one control rod having a maximum control rod worth is withdrawn from the all-rods-in state in the cold state of reactor is shown, where a differential from 1.00 is called "reactor shutdown margin". In view of the current design limit, the effective multiplication factor must be less than 0.99 at that time. In the said embodiment of the present invention an increase in the effective multiplication factor is small, as compared with that of the prior art fuel assembly, and thus a reduction in reactor shutdown margin is smaller, with less adverse effect.

In the foregoing embodiment, the number of gadolinia-containing fuel rods is made smaller in the lower region of the fuel assembly to make the total gadolinia content lower in the lower region of the fuel assembly than in the upper region thereof. This can be made by making the gadolinia content of gadolinia-containing fuel rods lower in the lower region of the fuel assembly than in the upper region thereof. Furthermore, the present fuel assembly having a higher rod-average enrichment in the upper region of the fuel assembly than in the lower region thereof and a lower total content of a burnable poison in the lower region of the fuel assembly than in the upper region thereof can be prepared by differentiating the enrichment between a section corresponding to the upper region of the fuel rods and a section corresponding to the lower region of the fuel rods without physically dividing the fuel rods into the upper and lower regions, or by adding gadolinia only to the upper region of some fuel rods and also only to the lower region of some other fuel rods and differentiating the numbers of these fuel rods, or by adding gadolinia only to the upper region of some fuel rods and also only to the lower region of some other fuel rods, and differentiating the gadolinia content between the upper region and the lower region, or by adding gadolinia with different contents to the upper region and the lower region of some fuel rods, etc. In these embodiments, the same effects as in the embodiment of FIGS. 3A and 3B can be obtained.

As described above, an increased spectral shift effect of BWR and an increased discharge exposure can be obtained with satisfactory maintenance of reactor shutdown margin according to the present invention.

We claim:

1. A fuel assembly for loading in the core of a boiling water reactor, said fuel assembly comprising a large number of vertically extended fuel rods, some of said fuel rods containing a burnable poison, a rod-average uranium enrichment of fuel being higher in an upper region of the fuel assembly in the vertical direction than in a lower region of the fuel assembly in the vertical direction and a total content of the burnable poison being lower in the lower region of the fuel assembly than in the upper region thereof.

2. A fuel assembly according to claim 1, wherein the number of fuel rods containing the burnable poison in the lower region of the fuel assembly is less than the number of fuel rods containing the burnable poison in the upper region of the fuel assembly.

3. A fuel assembly according to claim 1, wherein the content of the burnable poison in the lower region of at least one of the burnable poison-containing fuel rods is lower than that in the upper region thereof.

4. A fuel assembly according to claim 1, wherein the fuel rods are barrier fuel rods.

5. A fuel assembly according to claim 4, wherein the fuel rods comprise zircaloy claddings having Cu or Zr-lined inner surfaces.

6. A fuel assembly according to claim 1, wherein the burnable poison is gadolinia or $B_4C$.

* * * * *